US008722256B2

(12) United States Patent
Narula et al.

(10) Patent No.: US 8,722,256 B2
(45) Date of Patent: May 13, 2014

(54) MULTI-LAYERED, CHEMICALLY BONDED LITHIUM-ION AND LITHIUM/AIR BATTERIES

(75) Inventors: Chaitanya Kumar Narula, Knoxville, TN (US); Jagjit Nanda, Knoxville, TN (US); Brian L. Bischoff, Knoxville, TN (US); Ramesh R. Bhave, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 653 days.

(21) Appl. No.: 12/908,575

(22) Filed: Oct. 20, 2010

(65) Prior Publication Data

US 2012/0100440 A1    Apr. 26, 2012

(51) Int. Cl.
*H01M 4/485* (2010.01)
*H01M 8/22* (2006.01)

(52) U.S. Cl.
USPC ..... 429/405; 429/247; 429/231.3; 429/231.1; 429/231.8; 429/207; 429/246

(58) Field of Classification Search
USPC ......... 429/402–405, 207, 246–248, 250–252, 429/231–231.81
See application file for complete search history.

(56) References Cited

U.S. PATENT DOCUMENTS

| | | | |
|---|---|---|---|
| 5,698,339 A | 12/1997 | Kawakami et al. | |
| 6,306,545 B1 | 10/2001 | Carlson et al. | |
| 6,309,545 B1 * | 10/2001 | Penth et al. | 210/500.25 |
| 6,511,774 B1 | 1/2003 | Tsukuda et al. | |
| 7,399,322 B2 | 7/2008 | Yu | |
| 7,575,832 B2 | 8/2009 | Hennige et al. | |
| 7,655,360 B2 | 2/2010 | Hennige et al. | |
| 2003/0203282 A1 * | 10/2003 | Grugeon et al. | 429/231.95 |
| 2004/0131934 A1 | 7/2004 | Sugnaux et al. | |
| 2005/0221165 A1 | 10/2005 | Hennige et al. | |
| 2005/0221192 A1 | 10/2005 | Hennige et al. | |
| 2007/0117007 A1 * | 5/2007 | Visco et al. | 429/144 |
| 2007/0122716 A1 | 5/2007 | Seo et al. | |
| 2007/0243454 A1 * | 10/2007 | Klaassen | 429/52 |
| 2008/0032197 A1 | 2/2008 | Horpel et al. | |
| 2008/0138700 A1 | 6/2008 | Horpel et al. | |
| 2009/0111026 A1 | 4/2009 | Kim et al. | |
| 2009/0155678 A1 | 6/2009 | Less et al. | |

(Continued)

FOREIGN PATENT DOCUMENTS

| | | |
|---|---|---|
| EP | 2153990 | 2/2010 |
| JP | 5021051 | 1/1993 |

(Continued)

OTHER PUBLICATIONS

Arora, P. et al., "Battery Separators," *Chem. Rev.*, vol. 104, No. 10, pp. 4419-4462 (Oct. 19, 2004).

(Continued)

*Primary Examiner* — Milton I Cano
*Assistant Examiner* — Michael Dignan
(74) *Attorney, Agent, or Firm* — Klarquist Sparkman, LLP

(57) ABSTRACT

Disclosed are multilayer, porous, thin-layered lithium-ion batteries that include an inorganic separator as a thin layer that is chemically bonded to surfaces of positive and negative electrode layers. Thus, in such disclosed lithium-ion batteries, the electrodes and separator are made to form non-discrete (i.e., integral) thin layers. Also disclosed are methods of fabricating integrally connected, thin, multilayer lithium batteries including lithium-ion and lithium/air batteries.

6 Claims, 2 Drawing Sheets

(56) References Cited

U.S. PATENT DOCUMENTS

| | | | |
|---|---|---|---|
| 2009/0311418 A1 | 12/2009 | Hennige et al. | |
| 2010/0000079 A1 | 1/2010 | Horpel et al. | |
| 2010/0003401 A1 | 1/2010 | Horpel et al. | |
| 2010/0266907 A1* | 10/2010 | Yazami | 429/405 |

FOREIGN PATENT DOCUMENTS

| | | |
|---|---|---|
| JP | 2001043842 | 2/2001 |
| JP | 2005228513 | 8/2005 |
| KR | 10-2007-0069306 | 7/2007 |
| WO | WO2009011249 | 1/2009 |

OTHER PUBLICATIONS

Augustin, S. et al., "Ceramic but flexible: new ceramic membrane foils for fuel cells and batteries," *Desalination*, vol. 146, Issues 1-3, pp. 23-28 (Sep. 2002).

Chio, J. et al., "Enhancement of thermal stability and cycling performance in lithium-ion cells through the use of ceramic-coated separators," *Journal of Power Sources*, vol. 195, Issue 18, pp. 6192-6196 (Sep. 2010).

Dudney, N., "Addition of a thin-film inorganic solid electrolyte (Lipon) as a protective film in lithium batteries with a liquid electrolyte," *Journal of Power Sources*, vol. 89, Issue 2, pp. 176-179 (Aug. 2000).

Jeong, H. et al., "Effect of phase inversion on microporous structure development of $Al_2O_3$/poly(vinylidene fluoride-hexafluoropropylene)-based ceramic composite separators for lithium-ion batteries," *Journal of Power Sources*, vol. 195, Issue 18, pp. 6116-6121 (Sep. 2010).

Kim, K. et al., "Characteristics of PVdF-HFP/$TiO_2$ composite membrane electrolytes prepared by phase inversion and conventional casting methods," *Electrochim Acta*, vol. 51, Issue 26, pp. 5636-5644 (Aug. 2006).

Prosini, P. et al., "A novel intrinsically porous separator for self-standing lithium-ion batteries," *Electrochim Acta*, vol. 48, Issue 3, pp. 227-233 (Dec. 2002).

Sanchez, C. et al., "Applications of hybrid organic-inorganic nanocomposites," *J. Mater. Chem.*, vol. 15, Issue 35-36, pp. 3559-3592 (2005).

Shimonishi, Y. et al., "A study on lithium/air secondary batteries—Stability of NASICON-type glass ceramics in acid solutions," *J. Power Sources*, vol. 195, Issue 18, pp. 6187-6191 (Sep. 2010).

Takemura, D. et al., "A powder particle size effect on ceramic powder based separator for lithium rechargeable battery," *J. Power Sources*, vol. 146, Issues 1-2, pp. 779-783 (Aug. 2005).

Walcerius, A., "Electrochemical Applications of Silica-Based Organic-Inorganic Hybrid Materials," *Chem. Mater*, vol. 13, No. 10, pp. 3351-3372 (Sep. 18, 2001).

Wang, H. et al., "Inorganic composite membrane as the separator of lithium ion battery," *Acta Mater. Compos. Sin.*, vol. 26, No. 1, pp. 59-64 (Jan.-Feb. 2009).

Zhang, S. et al., "Alkaline composite film as a separator for rechargeable lithium batteries," *J. Solid State Electrochem.*, vol. 7, No. 8, pp. 492-496 (Aug. 2003).

Zhang, S. et al., "An organic composite membrane as the separator of Li-ion batteries," *J. Power Sources*, vol. 140, Issue 2, pp. 361-364 (Feb. 2005).

* cited by examiner

MULTI-LAYERED, CHEMICALLY BONDED LITHIUM-ION AND LITHIUM/AIR BATTERIES

ACKNOWLEDGMENT OF GOVERNMENT SUPPORT

This invention was made with government support under DE-AC05-00OR22725 awarded by the Department of Energy. The government has certain rights in the invention.

FIELD

Disclosed herein are embodiments of multi-layered, chemically bonded lithium-ion and lithium/air batteries and methods of making and using the same.

BACKGROUND

With the increasing demand and higher price of fossil fuels, in addition to global warming concerns from carbon dioxide emissions, energy storage systems such as batteries and capacitors with substantially higher energy and power densities are urgently needed in transportation and other applications. Lithium-ion batteries have been identified as a critical enabling technology for development of advanced, fuel-efficient vehicles, especially for plug-in hybrid electrical vehicles (PHEVs). However, there is a need to have lithium-ion batteries with a higher energy density, longer cycle and calendar life, improved safety, and lower cost than the currently known lithium-ion batteries. Lithium/air batteries are also promising technology but in need of economically viable, industrial-scale manufacturing methods and designs, as well as providing rechargeability with higher energy densities, and longer cycle life and calendar life.

SUMMARY

Disclosed are economically viable, industrial-scale producible multilayer lithium batteries, certain embodiments comprising in part, a porous anode layer having a first and a second surface, a porous cathode layer having a first and a second surface, and a porous, entirely inorganic separator layer having a first and a second surface, the first surface of the separator layer being integrally connected (chemically bonded) to the first surface of the cathode layer and the second surface of the separator being integrally connected to the first surface of the anode layer. The chemical connection being directly between the material forming all or part of the separator with the material forming all or part of the layer to which the separator is connected. Thus, the device comprises non-discrete layers forming certain of the battery components. The layers making up the components of the multilayered device are relatively thin as compared to commercially available like battery devices.

In alternative embodiments the multilayer lithium batteries include a negative current collector connected to the second surface of the anode layer and a positive current collector connected to the second surface of the cathode layer. Other embodiments of the disclosed batteries comprise lithium-ion batteries while yet others comprise lithium/air batteries.

In certain embodiments the batteries include a negative current collector chemically bonded to the second surface of the anode layer and/or a positive current collector chemically bonded to the second surface of the cathode layer. In yet other embodiments the batteries disclosed include a substantially, entirely inorganic separator comprising alumina, silica, titania, zirconia, niobium, tantalum oxide, or mixtures thereof. In other embodiments the substantially, entirely inorganic separator consists of alumina, silica, titania, zirconia, niobium, tantalum oxide, or a mixture thereof. In certain embodiments the batteries disclosed have an inorganic separator with a thickness of from 2 to 200 microns ($\mu$m) or 2 to 100 $\mu$m or less and may have average pore sizes of 10 nm to 1 $\mu$m or 0.03 to 0.1 $\mu$m.

In certain embodiments the batteries include a cathode layer having a thickness of 10 to 100 $\mu$m or less and the cathode layer comprises at least one of lithium cobalt oxide, $LiFePO_4$, $LiMn_2O_4$, $LiNiO_2$, $Li_2FePO_4F$, $LiCo_{0.33}Ni_{0.33}Mn_{0.33}O_2$, and/or $Li(Li_aNi_xMn_yCo_z)O_2$, wherein x is 0.5-0.3, y is 0.3, and z is 0.2-0.1, with a total composition of a, x, y, and z equal to 1.0. In other embodiments the anode layer has a thickness of 10-100 $\mu$m and comprises at least one of graphite, hard and/or soft carbon, titanate, Si, Ge, an intermetallic alloy having a crystalline, amorphous, and/or nanoparticle morphology. In certain embodiments the negative current collector has a thickness of 5-25 microns.

The batteries may include electrolytes comprising at least 1:1 w/w (or 3:7 v/v) of at least one lithium salt comprising lithium hexafluorophosphate, $LiClO_4$, $LiBOB$, $LiAsF_6$, $LiBF_4$, $LiSO_3CF_3$, or mixtures thereof, in at least one carbonate-based solvent or alternatively comprises a mixture of lithium electrolyte salts in aprotic ionic liquids, the electrolyte being dispersed in pores of the electrode and separator layers.

Also disclosed are multilayer, lithium/air batteries, certain embodiments comprising a lithium metal layer (either free standing or supported by a current collector layer, such as copper) having a first and a second surface and having a thickness of 10-100 dams, an air electrode comprising micro porous or mesoporous carbon structures, a porous, entirely inorganic separator layer having a first and a second surface, the first surface of the separator layer being integrally connected to the first surface of the anode layer and the separator having a thickness of from 2 to 100 $\mu$m.

Also disclosed are methods of fabricating, on an industrial scale and in an economically viable manner, multilayer, lithium-ion batteries. In certain embodiments of the methods comprise forming a positive and a negative current collector, forming a porous anode layer having a first and a second surface, wherein the second surface is connected to the negative current collector, forming a porous cathode layer having a first and a second surface, wherein the second surface is connected to the positive current collector, and forming a porous, entirely inorganic separator layer to be integrally connected to the first surface of the cathode layer and to be integrally connected to the first surface of the anode layer. Certain embodiments of the methods disclosed are used to form lithium/air batteries.

In particular embodiments of the disclosed methods the method includes forming the negative current collector to be integrally connected to the second surface of the anode layer and the positive current collector to be integrally connected to the second surface of the cathode layer. In particular embodiments the methods may include forming the inorganic separator using alumina, silica, titania, zirconia, niobium, tantalum oxide, or mixtures thereof. In certain embodiments the inorganic separator is formed to have an average pore size of 10 nm to 1 $\mu$m or 0.03 to 0.1 microns. In yet further embodiments the methods may include forming the cathode layer of at least one of lithium cobalt oxide, $LiFePO_4$, $LiMn_2O_4$, $LiNiO_2$, $Li_2FePO_4F$, $LiCO_{0.33}Ni_{0.33}Mn_{0.33}O_2$, and/or $Li(Li_aNi_xMn_yCo_z)O_2$, wherein x is 0.5-0.3, y is 0.3, and z is 0.2-0.1, with a total composition of a, x, y, and z equal to 1.0. In yet other embodiments the thicknesses of various layers are carefully controlled to form, for example, an inorganic separator having a thickness of from 2 to 200 μm or 2 to 100 μm or less.

DETAILED DESCRIPTION

I. Terms and Definitions

Figure 1:
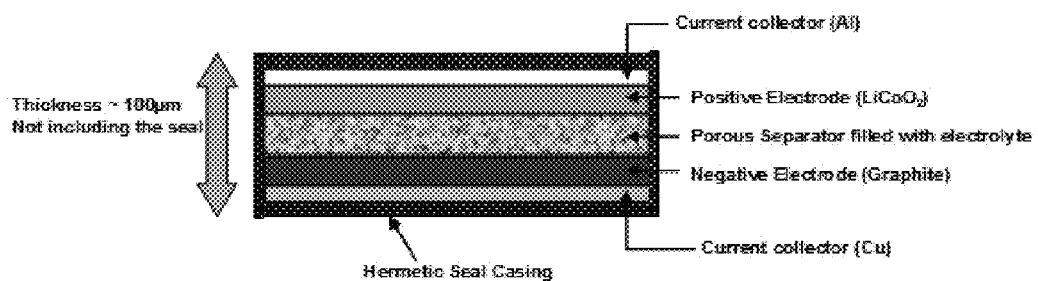
FIG. 1 is a schematic diagram of one embodiment of the disclosed lithium-ion battery.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Anode: An electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed lithium/air batteries or a galvanic cell, the anode is the negative terminal where electrons flow out. If the anode is composed of a metal, electrons that it gives up to the external circuit are accompanied by metal cations moving away from the electrode and into the electrolyte.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery, such as the disclosed lithium/air batteries or a galvanic cell, the cathode is the positive terminal, toward the direction of conventional current. This outward charge is carried internally by positive ions moving from the electrolyte to the positive cathode.

A current collector is a battery component that conducts the flow of electrons between an electrode and a battery terminal. The current collector also may provide mechanical support and functionality for the electrode's active material. For example, a metal mesh and/or foam current collector may provide mechanical support for the carbon film of a carbon-based air electrode and also allows oxygen and liquid electrolyte to pass through. Metal foam can also be a 3D current collector on which electrode materials can be coated or metal foil current collectors.

Intercalation: A term referring to the insertion of a material (e.g., an ion or molecule) into the microstructure of another material. For example, lithium ions can insert, or intercalate, into graphite (C) to form lithiated graphite ($LiC_6$).

Ion insertion (or intercalation) material: A compound capable of intercalating ions reversibly without irreversible change in its microstructure. For example, a lithium ion insertion material is capable of intercalating lithium ions. One example of a lithium ion insertion material is graphite, which is often used in lithium-ion batteries. Lithium ions intercalate into the carbon structure to form a maximum composition of $LiC_6$. Lithium ions can also be extracted from $LiC_6$ to re-form graphite.

Pore: One of many openings or void spaces in a solid substance of any kind. Pores are characterized by their diameters. According to IUPAC notation, Micropores are small pores with diameters less than 2 nm. Mesopores are mid-sized pores with diameters from 2 nm to 50 nm. Macropores are large pores with diameters greater than 50 nm. Porosity is a measure of the void spaces or openings in a material, and is measured as a fraction, between 0-1, or as a percentage between 0-100%.

Porous: A term used to describe a matrix or material that is permeable to fluids (such as liquids or gases). For example, a porous layer is a layer that is permeated by a network of pores (voids) that may be filled with electrolyte and/or material from another layer (forming a sort of gradient of a mixture of the materials as it moves from one material to the next, which creates an interconnection between the layers—making the non-discrete (integral) layers). In some examples, both the layers and the pore network therein are continuous, so as to form interpenetrating continua. Many materials such as metals and ceramics, can be prepared as porous media.

Sintering is the agglomeration of metal or earthy powders at temperatures below the melting point. Sintering commonly is used in powder metallurgy and ceramic firing. The powdered material is heated until its particles adhere to each other. Sintering increases strength, conductivity, and/or density.

Separator: A battery separator is a porous sheet or film placed between the anode and cathode. It prevents physical contact between the anode and cathode while facilitating ionic transport.

Specific energy: A term that refers to energy per unit of mass. Specific energy is commonly expressed in units of Wh/kg or J/kg. Specific energy is specific capacity multiplied by voltage; that is Ah×V. Here voltage refers to the nominal intercalation voltage of the redox couple. For example, for $LiCoO_2$ it is 3.8 V and for $LiFePO_4$ it is 3.4V. At times the specific energy is described in terms of cell level or system/pack level, such that the dead weight packaging and current collectors are accounted for in the total weight.

Specific power: A term that refers to power per unit of mass, volume, or area. For example, specific power may be expressed in units of W/kg.

II. Lithium Ion Batteries

A lithium-ion battery is a family of rechargeable battery types in which lithium ions move from the negative electrode to the positive electrode during discharge, and back when charging. Unlike lithium primary batteries, lithium-ion cells use an intercalated lithium compound as the electrode material instead of metallic lithium. The three primary functional components of a lithium-ion battery are the anode, cathode, and electrolyte. The anode (sometimes referred to herein as the negative electrode) of a conventional lithium-ion cell is made from carbon, the cathode (sometimes referred to herein as the positive electrode) is typically a metal oxide, and the electrolyte is typically a lithium salt in an organic solvent. The most commercially popular anode material is graphite. The cathode is generally one of three materials: a layered oxide (such as lithium cobalt oxide), a polyanion (such as lithium iron phosphate), or a spinel (such as lithium manganese oxide).

The electrolyte is typically a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). Lithium intercalates, formed during electrochemical reactions, are very reactive; they react vigorously with water to form lithium hydroxide and hydrogen gas is liberated. Thus, a hermetically-sealed container excludes water from the battery cell.

External faces of the electrodes are usually equipped with means to collect the charge generated by the battery during discharge, and to permit connection to an external power source during the recharging of the lithium-ion battery. Current collectors for such purposes are usually made of stainless steel, iron-nickel alloys, copper foil, aluminum and similar relatively inexpensive metals.

Lithium-ion batteries further include a battery separator typically comprising a porous sheet placed between the positive and negative electrodes, and being wetted with the liquid electrolyte. Its function is to prevent electrical contact between the positive and negative electrodes while serving as a permeable membrane to enable free ionic transport. Typically, natural or synthetic polymers are used as the separator material. The conventional separators are fabricated in the form of a cloth so that they are sufficiently flexible and compliant that allows insertion of the separators into existing battery structures during a manufacturing process. The natural materials conventionally used are normally celluloses and their chemically modified derivatives. The synthetic polymers conventionally available include polyolefins, polyvinylidene fluoride, polytetrafluoroethylene, polyamide, polyvinyl alcohol, polyester, polyvinyl chloride, nylon, poly(ethylene terephthalate) and so forth.

Conventional polymeric separators have disadvantages; due to the difference in expansion coefficients of the anode, cathode, and polymeric separator materials, the rate of failure is very high when these batteries are employed in automobiles. Automobile batteries must operate under a wide range of temperatures from $-49°$ F. ($-45°$ C.) to $140°$ F. ($60°$ C.). In addition, daily changes in temperature can be 20-30° C. in a given location. Under conditions of such repeated thermal cycling, polymeric separators expand and contract creating the potential for leaks and significantly reduced battery life.

Unlike the polymer-based separators that are susceptible to shrinkage and/or melting under large temperature window, the presently disclosed lithium-ion batteries include inorganic separators that survive robust thermal swings and provide better interfacial behavior in the assembled device that consists of a liquid electrolyte and positive and negative electrode layers because not only do inorganic separators survive higher temperatures than polymer-based separators, the coefficient of thermal expansion of inorganic separators match well with the electrode materials. In addition, the inorganic separators are more chemically inert than other materials. Furthermore, a purely inorganic, porous separator layer as disclosed herein provides superior thermal resistance under severe battery conditions such as overcharge and the like, that can lead to exothermic reactions compromising the safety aspects of the Li-ion cells especially when the separator melts or breaks down and forms holes that can short the electrodes. The high surface area and hydrophilic nature of the disclosed entirely inorganic separators in the disclosed batteries have excellent wetting properties even for electrolytes such as ethylene carbonate, propylene carbonate, γ-butyrolactone, which are unable to wet conventional polyolefin separators. Thermal stability and substantially zero-dimensional shrinkage under operating temperature limits of conventional batteries for automotive applications make the presently disclosed batteries, having purely inorganic separators, surprisingly useful with superior cycle life and calendar life.

There have been attempts made to create composite separator structures (a mixture of inorganic and organic materials) in attempt to overcome some of the disadvantages of purely or primarily polymer separators. While the composite separators have better wettability than purely organic separators, they must also be suitable for cell assembly, that is, sufficiently flexible to be inserted into existing battery structures. The commercially available SEPARION® separators are, essentially, flexible, perforated non-woven polymeric mats with porous ceramic coatings on both sides. However, while composite separators, such as silica/PET non-woven SEPARION® separators, have better wettability and thermal stability, the polymers included in such composite separators are still necessarily susceptible to the heat deterioration problems suffered by purely organic (or polymer-based composite) separators. That is, due to the differences in expansion coefficients of the anode, cathode, and the polymeric material in the composite separators, under conditions of repeated thermal cycling, the polymer material in composite separators is still susceptible to expansion and contraction, creating the potential for leaks and significantly reduced battery life. Furthermore, the organic materials in the composite separators are not as effective at higher temperatures since the polymeric materials soften making it difficult to maintain the porosity of the separator. As the polymer softens, the polymeric portion of the separators tends to clog holes through which the ions must travel.

Substantially entirely inorganic separators have not been presented in the conventional art in part due to the need to have relatively thin separators while maintaining flexibility of the separators so that they may be inserted into the battery packages during production under current battery manufacturing processes. This means that inorganic separators must be available as thin, flexible sheets. There are no industrial-scale, practical, low-cost methods to produce thin and flexible sheets of inorganic separators suitable for use in current battery manufacturing processes.

The presently disclosed lithium-ion batteries have overcome such problems by making multilayer, porous devices that include the separator as a layer that is integrally connected to the positive and negative electrode layers. As used herein integrally connected means chemically bonded. The separator thus may be formed of purely inorganic material as it does not need to function as a standalone part or have a need to be flexible so that it can be inserted into the battery package. The presently disclosed lithium-ion batteries, the electrodes and separator are made to form non-discrete (i.e., chemically bonded) thin layers. The new integral multi-layer approach of forming the electrodes and separators eliminates the need to make the separator as a standalone piece and the need for the separator to be flexible to fit into existing, separately fabricated, battery packages. Further, the presently disclosed lithium-ion batteries may include one or more current collector layers, upon which the electrode thin layers may be deposited.

Specifically, with reference to FIG. 1, the present lithium-ion batteries may comprise current collector layers having sandwiched therebetween, a negative electrode, a porous, inorganic separator wetted with electrolyte, and a positive electrode. The entire device is hermetically sealed in a casing.

A first current collector, in contact with the negative electrode, may comprise a porous copper foil. The first current collector is preferably 5 microns in thickness but can be varied between 5-25 microns in thickness. Generally a denser current collector is useful to increase the conductivity, however, a certain amount of porosity (e.g., microporosity) aids in adherence of the negative electrode layer to minimize chances of delamination. The current collector can be made by known, standard powder metallurgy techniques, including but not limited to tape casting, isostatic pressing, hot pressing, extrusion, and injection molding. The pore size of the current collector is formed by the spaces between the copper particles and is proportional to the particle size. The porosity of void volume is typically between 30 and 50% but can be increased by the use of pore-formers added during the forming process to increase the porosity to as high as 70 or 80%.

The second current collector, in contact with the positive electrode, may comprise a thin layer of porous aluminum, nickel or stainless steel and similar relatively inexpensive metals. The second current collector is preferably 5 microns in thickness but can be varied between 5-25 microns in thickness. Generally a denser current collector increases the conductivity, however, a certain amount of porosity (e.g., microporosity) aids in adherence of the positive electrode layer to minimize chances of delamination. The second current collector can be made by any of the techniques described above for the first current collector.

Embodiments of the disclosed Li-ion batteries include a negative electrode layer in contact with the first current collector. The anode or negative electrode layer may comprise any form of carbon (hard, graphite and/or amorphous carbon), lithium-alloying materials, lithium titanate, oxides of cobalt and/or molybdenum, and may have a thickness of 10-100 microns, or a thickness range of 25-50 microns. The presently disclosed multi-layered, chemically bonded Li-ion battery devices and fabrication methods allow for the thickness of the anode layer to be varied or manipulated as per the desired power and energy requirements. High energy batteries typically use thicker electrodes, such as on the order of from 50 microns or 100 microns or 200 microns when the process fabrication methods permit. The anode layer may be formed using methods such as slot dye coating, plasma or thermal spray, solution or screen printing technique. For materials systems that require a controlled atmosphere, CVD, PVD, sputtering, ablation can be used to form the negative electrode. A relatively thick electrode can increase the total energy stored gravimetrically and/or volumetrically with total energy contents exceeding 400 Wh/Kg at cell level for Li-ion cells. The current energy density for conventional Li-ion cells is 100-200 Wh/Kg at the most at a cell level.

Embodiments of the negative electrode layer have a sufficient porosity to allow the electrolyte to percolate through. The porosity of the negative electrode layer may be 20-40% or 20-30%. In certain embodiments the porosity of the negative electrode layer is as high as 50%.

If the porosity of the negative electrode layer is too low, e.g., less than 20%, it will affect the rate performance of the cell as the electrolyte cannot be accessed by the active materials for Li-ion transport. Control of the porosity also provides mechanical stability to the resulting multi-film device forming the Li-ion battery, in part by avoiding delamination since the layers are integrally connected at their surfaces.

It is also useful to control the uniformity of the pore sizes throughout the electrode layer. In some embodiments the pore size of the negative electrode layer is substantially uniform across and within the layer; for example, the negative electrode layer pores are within at least 50%, such as 60%, 70%, 80%, 90% or more of the same size.

Embodiments of the disclosed Li-ion batteries include a positive electrode layer in contact with the second current collector. The cathode or positive electrode layer may comprise films of transition metal oxides $LiMO_2$, $LiM_2O_4$, and/or $LiMPO_4$ wherein M may comprise Ni, Mn, Co, Fe, and/or Mo. Certain Li-ion battery embodiments disclosed herein include cathodes comprising $LiCoO_2$, $LiMn_2O_4$, and/or $Li(Ni_xMn_yCo_z)O_2$, vanadium oxides, olivines (such as $LiFePO_4$), and rechargeable lithium oxides. The cathode material may include substitution atoms that stabilize the crystal lattice upon delithiation. Examples of substitution atoms include Al, Cr, Mg, vanadium-based oxides and metallo-silicates having the structural formula, $LiMSiO_4$.

Embodiments of the positive electrode layer may have the same thicknesses, porosities and pore uniformity as discussed above in regard to the negative electrode layer.

The positive electrode layer may be formed on the second current collector by powder or ceramic processing, slot-dye coating, vapor deposition, sputtering, tape casting, screen printing and like known methods.

The separator layer, preferably comprising oxides such as, but not limited to alumina, silica, titania, zirconia, niobium or tantalum oxide or a mixture thereof, such as silica-alumina, silica-titania and the like may be grown or deposited to be integrally connected on both the positive and negative electrode layers. Using, for example, a solutions method such sol-gel type processing, template-assisted sol-gel processing, or by use of metal alkoxide solutions first and second pre-separator coatings are grown or deposited on the negative and the positive electrodes. Other deposition methods such as CVD, PVD, sputtering, ablation and like known methods can also be employed to fabricate the separator material layers on both electrodes. Both the porosity of the electrode layers and the chemical attractions between the electrode layer materials and the separator material ensure that non-discrete layers (i.e., chemically bonded layers of material) are formed, which aids in avoiding problems such as delamination. The two separator layers integrally connected (i.e., meaning chemically bonded) to the respective electrode layers are then bonded to one another with more of the separator material, such as alumina. A solution method such as a sol-gel type process, template-assisted sol-gel process, or metal alkoxide solutions can be employed for this purpose. The chemical bonding of the layer means that the interface between layers of those differing materials has chemical bonds rather than being discrete layers or being filled with amorphous materials being discrete layers or being limited to van-der-waal interactions. Chemically bonded as used herein does not include discrete layers simply connected to one another via an adhesive material that is different from the material making up one or both of the layers. Thus, the battery is formed as a single monolithic piece using a layer-by-layer process, unlike the prior art where individual pieces are made separately and then pressed into a specific form to form a battery.

The resulting separator layer may have a thickness of between 2-200 microns, or 2-100 microns, or 2-50 microns, or of 10 microns. Embodiments of the separator layer have a sufficient porosity to allow the electrolyte to percolate through. The porosity of the separator layer may be 40-50% or as high as 60% or as low as 30%. If the porosity of the separator layer is too low, such as below 30%, there is a risk of blocking ion movement within and through the material and hence limiting battery performance. The pore sizes may range from 0.03-0.1 micron.

It is also useful (and in certain embodiments is important) to control the uniformity of the pore sizes throughout the separator layer, as this improves tortuosity of the separator. Alternatively, a gradient pore structure across the thickness from 80-50% can also be used for separators. In some embodiments the pore size of the separator layer is substantially uniform across and within the layer; for example, the negative electrode layer pores are within at least 50%, such as 60%, 70%, 80%, 90% or more of the same size.

The electrolyte is typically a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The electrolyte wets the separator, the positive and the negative electrodes.

The entire multi-layered assembly is hermetically sealed to prevent air or moisture contamination of the electrolyte solution. Any suitable casing may be used, such as epoxy or perylene.

The presently disclosed lithium-ion batteries utilize a new method for making such batteries with thin, multilayer batteries having substantially entirely inorganic separators integrally connected to the negative and positive electrodes. Specifically, multilayer, integrated, porous, thin-layered devices are fabricated such that the batteries maintain structural integrity even after extensive thermal cycling under inherently reactive environment. Such a device, when impregnated with liquid electrolyte, functions as a highly durable Li-ion battery.

In certain embodiments, a layer-by-layer fabrication approach is taken whereby first and second current collectors are formed. A first electrode slurry is coated on the first current collector thereby forming a negative electrode layer that may be integrally connected to the first current collector. A second electrode slurry is coated onto the second current collector to form the positive electrode layer that may be integrally connected to the second current collector. Porous inorganic separator coatings are grown on the positive and negative electrode layers and the two inorganic separator coatings are bonded together with separator material to form a single, porous separator layer that is chemically bonded on either side to the respective electrodes. The resulting chemically bonded, porous, five-layer device allows percolation of liquid electrolyte into the electrode and separator layers. Lastly, the entire assembly is hermetically sealed to prevent air and/or moisture contamination of the electrolyte solution in the multi-layer porous composite assembly.

The disclosed multilayer cell allows for building successive layers of battery materials with varying porosity, thicknesses, microstructures, etc. for optimizing their electrochemical performance and design. Such an integrated approach for fabricating the disclosed Li-ion batteries may be done by batch or stepwise processes wherein the electrode slurries are prepared and then coated onto current collectors followed by jelly roll assembly and packaging. The purely inorganic separator layer is grown or deposited directly onto the electrode layers avoiding the need to incorporate the separators separately as a film or fabric (cloth). The presently disclosed fabrication processes also allow for variation of compositions (including doping) as well as control on the micro-structure level of the electrode layers, to maintain higher ionic and electronic conductivity for extended cycle life of the battery.

III. Lithium/Air Batteries

The presently disclosed methods and devices also apply to lithium/air batteries. Li/air batteries have a much higher specific energy than most available primary and rechargeable batteries. These batteries are unique in that the cathode active material is not stored in the battery. Oxygen from the environment is reduced by catalytic surfaces inside the air electrode, forming either an oxide or peroxide ion that further reacts with cationic species in the electrolyte. Rather than using the hermetically-sealed casing as discussed above in relation to the Li-ion battery, the casing for the Li/air battery is oxygen permeable but to make sure the lithium metal side is covered or protected by a chemically resistant coating in a manner that it does not come into contact with air/oxygen. One example of an $O_2$-permeable casing (which is also heat sealable) is MELINEX® 301H, which comprises a biaxially-oriented PET polymer film layer and a thermal bonding polymer layer comprising a terephthalate/isophthalate copolyester of ethylene glycol (commercially available from DuPont Teijin Films of Wilmington, Del.). The thickness of MELINEX® 301H (or MELINEX® 851) membranes ranges from 48 gauge to 240 gauge (0.5 mil to 2.5 mil, or 12 μm to 61 μm). The above embodiment is what is used in between the oxygen/air and the air cathode to purify. The oxygen in gaseous form or dissolved in the electrolyte then diffuses through the porous air cathode to form the reaction product.

Figure 2:
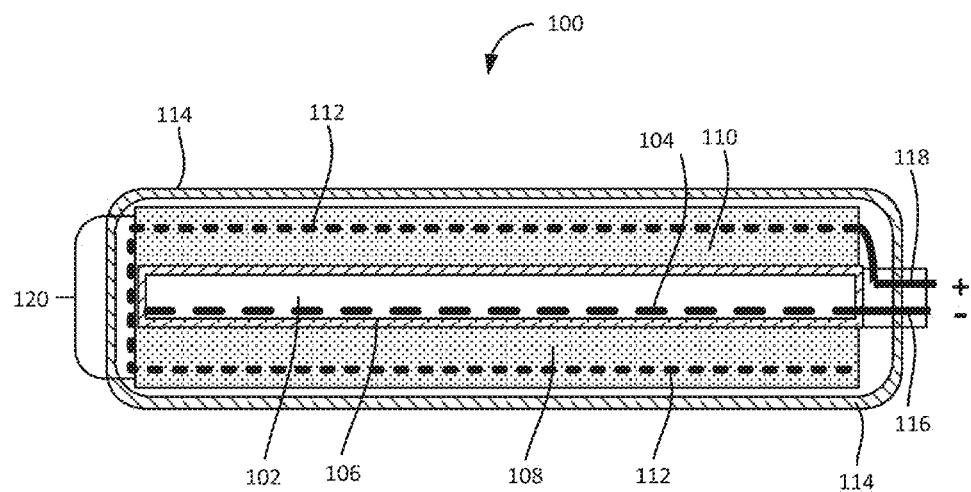
FIG. 2 is a schematic diagram of one embodiment of the disclosed lithium/air battery.

A cross-sectional diagram of an exemplary double-sided Li/Air battery is shown in FIG. 2. The battery 100 comprises an anode 102, an anode current collector 104, a separator 106, two air electrodes 108, 110, a cathode current collector 112, and an outer package 114.

In an exemplary embodiment, the anode 102 is lithium foil with a thickness of 10-100 microns. An anode current collector 104 (e.g., copper metal sheets or copper mesh) is pressed into the lithium anode 102. One end 116 of the cathode current collector 104 extends through the separator 106 and the package 114 to outside the cell 100 to make electrical contact.

The anode 102 and anode current collector 104 are substantially encased within, and in physical contact with the purely inorganic separator 106 as discussed above in relation to the Li-ion battery. The separator is the same as described for the Li-ion battery. One end 116 of the anode current collector 104 extends through the separator 106 to outside the cell 100.

Two carbon-based air electrodes 108, 110 (e.g., 100 microns thick) are positioned in contact with the separator 106. Scientifically speaking, oxygen itself is considered to be the cathode in a lithium/air battery. Hence the carbon-based electrode is termed an air electrode rather than a cathode. A cathode current collector 112 is embedded within each carbon-based air electrode 108, 110. Cathode current collector 112 typically is a porous structure or a membrane to allow passage of air or oxygen through the current collector. One end 118 of the cathode current collector 112 extends through the package 114 to outside the cell 100 to make electrical contact. Suitable cathode current collectors include nickel mesh, aluminum mesh, and nickel-coated aluminum mesh.

The following Examples provide various features, methods of making and particular embodiments of the invention and are given for illustration purposes, and are not intended to limit the scope of the invention.

Example 1

Lithium-Ion Battery Forming a Multilayer Thin-Layered Device with Lithium Cobalt Oxide as Cathode An embodiment of the multilayer, relatively thin-layered device may be fabricated by making a porous copper current collector of 100 micron thickness by standard powder metallurgy methods, including but not limited to tape casting, extrusion, hot or cold pressing, centrifugal casting, or injection molding. In this example, the porous copper current collector is made by isostatic pressing of a 5 micron copper powder. The formed product is sintered in a reducing environment such as hydrogen to achieve a porous sintered sheet. The pore size of the current collector is formed by the spaces between the particles and will average approximately 2-3 microns with a porosity of 30-35%.

A 50 micron thick amorphous carbon anode is deposited by sputtering carbon onto the copper current collector. A stainless steel current collector of 100 micron thickness is fabricated by standard powder metallurgy methods including but not limited to tape casting, extrusion, hot or cold pressing, centrifugal casting, or injection molding. In this example, the porous stainless steel is made by tape casting a mixture of 5 micron stainless steel (316L) powder in an aqueous acrylic binder. The formed 500-micron thick product is sintered at 1050° C. for one hour in a reducing environment such as hydrogen to achieve a porous sintered sheet. The pore size of the current collector is formed by the spaces between the particles and will average approximately 3 microns with a porosity of 30-35%.

A $LiCoO_2$ cathode is deposited on the current collector by solution method employing a precursor solution of a metal alkoxide $Li(THF)_3Co(\mu-Cl)(OCBu^t_3)_2$ in THF (tetrahydrofuran) and subsequent heating at 500° C. or 4 hours. Addition of $Li(O^tBu)$ is desirable to compensate for the loss of lithium during heat treatment. A thin, 5-micron thick porous layer of alumina is deposited on both the carbon anode and the $LiCoO_2$ cathode from sol-gel processed alumina solution and the anode containing component is placed over the cathode containing component while the alumina sol is still wet. Alumina sol for this application is prepared from $Al(sec-OC_4H_9)$ (9.58 g) hydrolyzed in distilled water (80 ml) at 80° C. and peptized with 1M nitric acid (2.8 ml). The device is allowed to dry and is then heated at a rate of 5° C./minute to 400° C. in the furnace in air to convert the dry alumina sol layer (or gel layer) into a continuous, amorphous alumina between the two electrodes. The total thickness of alumina in this device is 10 microns with a 50% porosity. Electric contact wires are attached to both current collectors.

The multilayer device is then filled with the electrolyte lithium triflate or $LiPF_6$ in EC-DMC, lithium bis(oxalato) borate (LiBOB), lithium bis(trifluoromethanesulfonyl)imide (LiTFSI) and the like, and hermetically sealed using epoxy.

Example 2

Lithium-Ion Battery Forming a Multilayer Device with Lithium Manganese Oxide as Cathode An embodiment of the disclosed multilayer, relatively thin-layer device is fabricated making a copper current collector of 100 microns in thickness using standard powder metallurgy methods, including but not limited to tape casting, extrusion, hot or cold pressing, centrifugal casting, or injection molding.

In this example, the porous copper current collector is made by tape casting a mixture of 3-micron fine copper powder using an aqueous acrylic binder system. A pore former, such as corn starch, can be used to increase the porosity but is not employed in this example. The formed product is sintered in a reducing environment, such as hydrogen, to achieve a porous sintered sheet at 750° C. for one hour. The pore size of the copper current collector is formed by the spaces between the particles and will average approximately 1-2 microns with a porosity of 30-35%. A 50-micron thick amorphous carbon anode is deposited on the copper current collector by chemical vapor deposition at 600° C. employing acetone as a carbon precursor. A stainless steel current collector of 100 microns in thickness is fabricated by standard powder metallurgy methods including but not limited to tape casting, extrusion, hot or cold pressing, centrifugal casting, or injection molding. In this example, the porous stainless steel is made by isostatic pressing of 5 micron stainless steel (316L) powder. The formed product is sintered at 1050° C. for one hour in a reducing environment, such as hydrogen, to achieve a porous sintered sheet. The pore size of the stainless steel current collector is formed by the spaces between the particles and will average approximately 2 microns with a porosity of 30-35%.

A $LiMn_2O_4$ cathode is deposited on the stainless steel current collector by solution method employing a precursor solution of a metal alkoxide $Li_2Mn(\mu-Br)_2(\mu-OCBu^t_3)_2(THF)_2$ in THF (tetrahydrofuran) and a subsequent heat treatment to convert it to the oxide at 600° C. for 4 hours. Addition of $Li(O^tBu)$ is desirable to compensate for the loss of lithium during heat treatment. A 5 micron thick porous layer of alumina is deposited on both the carbon anode and the $LiCoO_2$ cathode from sol-gel processed alumina solution and an anode containing component is placed over the cathode-containing component while the alumina sol is still wet. Alumina sol for this application is prepared from $Al(sec-OC_4H_9)$ (9.58 g) hydrolyzed in distilled water (80 ml) at 80° C. and peptized with 1M nitric acid (2.8 ml). The device is allowed to dry and is then heated at a rate of 5° C./minute to 400° C. to convert dry alumina sol layer (or gel layer) into a continuous, amorphous alumina between the two electrodes. The total thickness of alumina in this device is 10 microns with a 50% porosity. Electric contact wires are attached to both current collectors. The multilayer device is then filled with an electrolyte comprising lithium tetrafluoroborate and is hermetically sealed using epoxy.

Example 3

Lithium/Air Battery Forming a Multilayer Thin-Layer Device

Lithium metal foil mechanically joined with flat copper current collector or stainless steel substrate is used as the anode. Alternatively, Li-metal is sputter deposited using physical vapor deposition technique on copper or stainless steel foil. The total thickness of the layers can be in the range of tens of microns to 200 microns or higher.

A copper current collector of 100 micron thickness fabricated by standard powder metallurgy methods, by tape casting a mixture of fine copper powder, with an average particle size of 3 microns, with an aqueous latex acrylic binder system. A pore former such as rice starch can be used to increase the porosity but is not employed in this example. The formed product is sintered at 750° C. for 1 hour in a reducing environment, such as hydrogen, to achieve a porous sintered sheet. The pore size of the copper current collect is formed by the spaces between the particles and will average approximately 1-2 microns with a porosity of 30-35%.

A porous carbon layer forming the air cathode is deposited on the porous copper current collector. The alumina separator is then deposited on the carbon air cathode by the method described in Example 1. The battery is assembled by filling the device with electrolyte between the cathode and the anode, hermetically sealing the anode side to the battery to prevent direct exposure of lithium to air while the cathode side is porous to enable $O_2$ permeation.

Embodiments of the present invention may take the form of any combination of the various components mentioned above having any of the recited features disclosed. Embodiments may also comprise multilayer lithium batteries comprising a porous anode layer having a first and a second surface, a porous cathode layer having a first and a second surface, and a porous, entirely inorganic separator layer having a first and a second surface, the first surface of the separator layer being integrally connected to the first surface of the cathode layer and the second surface of the separator being integrally connected to the first surface of the anode layer.

In certain embodiments the disclosed battery includes a negative current collector connected to the second surface of the anode layer and a positive current collector connected to the second surface of the cathode layer. In other embodiments, including any one or more of those discussed above, the disclosed battery the negative current collector is integrally connected to the second surface of the anode layer and/or the positive current collector is integrally connected to the second surface of the cathode layer. In other embodiments, including any one or more of those discussed above, the inorganic separator of the disclosed battery comprises alumina, silica, titania, zirconia, niobium, tantalum oxide, or mixtures thereof. In other embodiments, including any one or more of those discussed above, the inorganic separator of the disclosed battery comprises consists of alumina, silica, titania, zirconia, niobium, tantalum oxide, or a mixture thereof.

In yet other embodiments, including any one or more of those discussed above, the inorganic separator of the disclosed battery has a thickness of from 2 to 200 μm. In yet other embodiments, including any one or more of those discussed above, the inorganic separator of the disclosed battery has an average pore size of 10 nm to 1 μm or 0.03 to 0.1 microns. In yet other embodiments of the disclosed battery, including any one or more of those discussed above, the cathode layer has a thickness of 10-100 microns. In certain embodiments of the disclosed battery, including any one or more of those discussed above, the cathode layer comprises at least one of lithium cobalt oxide, $LiFePO_4$, $LiMn_2O_4$, $LiNiO_2$, $Li_2FePO_4F$, $LiCo_{0.33}Ni_{0.33}Mn_{0.33}O_2$, and/or $Li(Li_aNi_xMn_yCo_z)O_2$, wherein x is 0.5-0.3, y is 0.3, and z is 0.2-0.1, with a total composition of a, x, y, and z equal to 1.0. In yet other embodiments of the disclosed battery, including any one or more of those discussed above, the anode layer has a thickness of 10-100 microns. In certain embodiments of the disclosed battery, including any one or more of those discussed above, the anode layer comprises at least one of graphite, hard and/or soft carbon, titanate, Si, Ge, an intermetallic alloy having a crystalline, amorphous, and/or nanoparticle morphology.

In yet other embodiments, including any one or more of those discussed above, the negative current collector has a thickness of 5-25 microns. In certain embodiments of the disclosed battery, including any one or more of those discussed above, the electrolyte comprises at least 1:1 w/w (or 3:7 v/v) of at least one lithium salt comprising lithium hexafluorophosphate, $LiClO_4$, LiBOB, $LiAsF_6$, $LiBF_4$, $LiSO_3CF_3$, or mixtures thereof, in at least one carbonate-based solvent or alternatively comprises a mixture of lithium electrolyte salts in aprotic ionic liquids, the electrolyte being dispersed in pores of the electrode and separator layers.

In another embodiment of the disclosed lithium batteries, a multilayer, lithium/air battery comprises a lithium metal layer having a first and a second surface and having a thickness of 10-100 microns, an air electrode, an anode current collector, a porous, entirely inorganic separator layer having a first and a second surface, the first surface of the separator layer being integrally connected to the first surface of the anode layer and the separator having a thickness of from 2 to 100 μm.

In certain embodiments of the disclosed methods for making the lithium batteries, the method includes fabricating a multilayer, lithium-ion battery by forming a positive and a negative current collector, forming a porous anode layer having a first and a second surface, wherein the second surface is connected to the negative current collector, forming a porous cathode layer having a first and a second surface, wherein the second surface is connected to the positive current collector, and forming a porous, entirely inorganic separator layer to be chemically bonded to the first surface of the cathode layer and to be integrally connected to the first surface of the anode layer. In yet other embodiments, including any one or more of those discussed above, the disclosed methods for making the lithium batteries further comprise forming the negative current collector to be integrally connected to the second surface of the anode layer and the positive current collector to be integrally connected to the second surface of the cathode layer. In yet other embodiments, including any one or more of those discussed above, the disclosed methods for making the lithium batteries further comprise forming the multilayer lithium battery to form a lithium-ion battery on an industrial scale at a commercially viable cost. In yet other embodiments, including any one or more of those discussed above, the disclosed methods for making the lithium batteries further comprise forming the inorganic separator of alumina, silica, titania, zirconia, niobium, tantalum oxide, or mixtures thereof. Certain embodiments, including any one or more of those discussed above, the disclosed methods include forming the inorganic separator is formed to have an average pore size of 10 nm to 1 μm or 0.03 to 0.1 microns. Certain embodiments, including any one or more of those discussed above, the disclosed methods include forming the cathode layer to comprise at least one of lithium cobalt oxide, $LiFePO_4$, $LiMn_2O_4$, $LiNiO_2$, $Li_2FePO_4F$, $LiCo_{0.33}Ni_{0.33}Mn_{0.33}O_2$, and/or $Li(Li_aNi_xMn_yCo_z)O_2$, wherein x is 0.5-0.3, y is 0.3, and z is 0.2-0.1, with a total composition of a, x, y, and z equal to 1.0. In yet other embodiments, including any one or more of those discussed above, the disclosed methods for making the lithium batteries further comprise forming the inorganic separator to have a thickness of from 2 to 200 μm.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device comprising:
a multilayer, lithium/air battery comprising:
a lithium metal anode layer having a first and a second surface and having a thickness from 10-100 microns;
an air electrode;
an anode current collector;
a porous, entirely inorganic separator layer consisting essentially of alumina, silica, titania, zirconia, niobium, tantalum oxide, or mixtures thereof and having a first and a second surface, the first surface of the separator layer being integrally connected to the first surface of the anode layer and the separator having a thickness of from 2 to 100 μm.

2. The device of claim 1 wherein the inorganic separator comprises alumina.

3. A multilayer, lithium/air battery comprising:
a lithium metal anode layer having a first and a second surface and having a thickness from 10-100 microns; and
a porous, entirely inorganic separator consisting essentially of alumina, silica, titania, zirconia, niobium, tantalum oxide, or mixtures thereof and having a first and a second surface, the first surface of the separator being integrally connected to the first surface of the anode layer.

4. The lithium/air battery of claim 3 further comprising an anode current collector connected to the second surface of the anode layer.

5. The lithium/air battery of claim 4 wherein the anode and anode current collector are substantially encased within, and in direct physical contact with, the entirely inorganic separator.

6. The lithium/air battery of claim 3 further comprising a first air electrode connected to the inorganic separator layer.

* * * * *